United States Patent
Fripp et al.

(10) Patent No.: US 11,313,206 B2
(45) Date of Patent: Apr. 26, 2022

(54) REDUNDANT POWER SOURCE FOR INCREASED RELIABILITY IN A PERMANENT COMPLETION

(71) Applicant: Halliburton Energy Services, Inc., Houston, TX (US)

(72) Inventors: Michael Linley Fripp, Carrollton, TX (US); Thomas Jules Frosell, Irving, TX (US); James Flygare, Humble, TX (US); Richard Decena Ornelaz, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 58 days.

(21) Appl. No.: 15/778,072

(22) PCT Filed: Jun. 28, 2017

(86) PCT No.: PCT/US2017/039637
§ 371 (c)(1),
(2) Date: May 22, 2018

(87) PCT Pub. No.: WO2019/005023
PCT Pub. Date: Jan. 3, 2019

(65) Prior Publication Data
US 2021/0172295 A1      Jun. 10, 2021

(51) Int. Cl.
*E21B 29/02*     (2006.01)
*E21B 43/00*     (2006.01)
*E21B 41/00*     (2006.01)
*H02J 1/10*      (2006.01)
*H02J 7/34*      (2006.01)

(52) U.S. Cl.
CPC ............ *E21B 41/0085* (2013.01); *H02J 1/10* (2013.01); *H02J 7/34* (2013.01)

(58) Field of Classification Search
CPC ............ E21B 41/0085; H02J 1/10; H02J 7/34
See application file for complete search history.

(56) References Cited

U.S. PATENT DOCUMENTS

| | | | |
|---|---|---|---|
| 6,046,685 A * | 4/2000 | Tubel | E21B 23/03 137/606 |
| 7,735,555 B2 | 6/2010 | Patel et al. | |
| 8,102,276 B2 | 1/2012 | Sugiura | |

(Continued)

FOREIGN PATENT DOCUMENTS

EP        2271821 B1      4/2017

*Primary Examiner* — Daniel Cavallari
*Assistant Examiner* — Rasem Mourad
(74) *Attorney, Agent, or Firm* — Scott Richardson; Parker Justiss, P.C.

(57) ABSTRACT

A completion system and a method for powering a downhole component of a wellbore are provided. In one example, in the completion system comprises at least three different types of power sources for powering a downhole component in a wellbore and a power distribution circuit including a power distribution node and a control circuit, wherein the control circuit is configured to select at least one power source of the at least three different types of power sources to connect to the power distribution node based on a selection priority of the power sources, and the power distribution node is configured to provide power from the at least one power source to the downhole component.

19 Claims, 5 Drawing Sheets

(56) References Cited

U.S. PATENT DOCUMENTS

| | | |
|---|---|---|
| 8,469,084 B2 | 6/2013 | Clark et al. |
| 8,567,524 B2 | 10/2013 | Schimanski et al. |
| 9,007,233 B2 | 4/2015 | Sugiura |
| 2002/0114216 A1* | 8/2002 | Veneruso ............ E21B 17/028 367/83 |
| 2005/0185352 A1 | 8/2005 | Nguyen |
| 2006/0196664 A1* | 9/2006 | Hall ................... E21B 44/00 166/297 |
| 2007/0241732 A1* | 10/2007 | Luo .................... H02J 2207/40 323/281 |
| 2007/0290663 A1 | 12/2007 | McClure et al. |
| 2009/0151932 A1* | 6/2009 | Hall ................... F16L 15/08 166/244.1 |
| 2010/0264741 A1* | 10/2010 | Togare ................ G06F 1/263 307/80 |
| 2013/0319685 A1 | 12/2013 | Pike |
| 2016/0003017 A1* | 1/2016 | Keller ................ E21B 43/162 166/250.1 |
| 2016/0201437 A1* | 7/2016 | Chin ................... E21B 47/20 175/40 |
| 2017/0145823 A1* | 5/2017 | Liu ..................... G01N 9/36 |
| 2017/0190948 A1* | 7/2017 | Offenbacher ........ C09K 8/52 |
| 2017/0264122 A1* | 9/2017 | Greening ............ H02J 7/0071 |

\* cited by examiner

REDUNDANT POWER SOURCE FOR INCREASED RELIABILITY IN A PERMANENT COMPLETION

CROSS-REFERENCE TO RELATED APPLICATION

This application is the National Stage of, and therefore claims the benefit of, International Application No. PCT/US2017/039637 filed on Jun. 28, 2017, entitled "REDUNDANT POWER SOURCE FOR INCREASED RELIABILITY IN A PERMANENT COMPLETION". The above application is commonly assigned with this National Stage application and is incorporated herein by reference in its entirety.

BACKGROUND

A permanent well completion system needs electrical power to operate its various downhole components. For example, the permanent well completion system needs electrical power to operate actuators to drive valves and sleeves, sensors to measure various aspects of the formation and fluid, and telemetry to send and receive information.

Today's permanent well completion systems generally run on a single electrical power source. As such, when that sole power source fails, the various downhole components of the completions can become inoperable.

BRIEF DESCRIPTION

Reference is now made to the following descriptions taken in conjunction with the accompanying drawings, in which.

DETAILED DESCRIPTION

A permanent well completion system having multiple, redundant power sources, can sustain a failure of one or more of the redundant power sources and still continue to carry out its intended functions. The current disclosure introduces a method and a mechanism for utilizing multiple, redundant power sources of different types for operating components of a permanent well completion system.

The permanent well completion system disclosed herein have at least three different types of power sources, including one or more surface-generated power source, one or more downhole-generated power source, and one or more downhole or locally-stored power source. The permanent well completion systems, referred to hereinafter as completion systems, also have power distribution electronics that switchably connect at least one of the power sources to various downhole components of the completion systems. When one of the power sources fails to operate or provide sufficient power to the downhole component(s), the power distribution electronics can replace or supplement a present power source with another one of the multiple types of power sources. As such, the introduced method and mechanism provide a fortified permanent well completion system.

Moreover, the power distribution electronics disclosed herein can replace or supplement a present power source with another type of power source based on factors, such as, a selection priority of the power sources and an operating mode of the completion system. As such, the disclosed completion systems can lessen the stress on the power sources and extend the life of the power sources.

Figure 1:
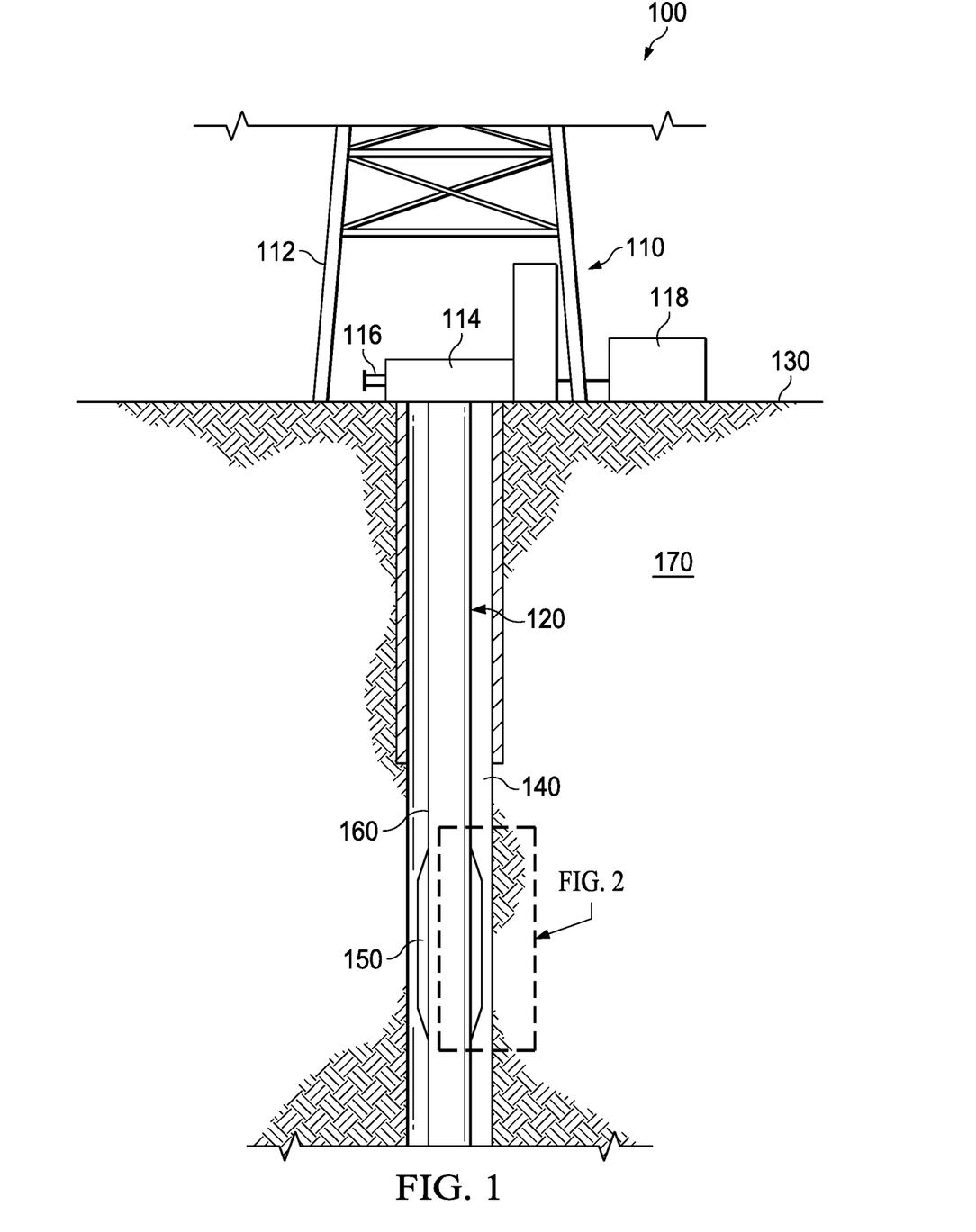
FIG. 1 is a system diagram of an example well system having a permanent well completion system.

FIG. 1 illustrates a system diagram of an example well system 100 having a permanent well completion system ("completion system") 150. The well system 100 is for obtaining hydrocarbons from a subterranean formation 170 or for injecting fluids into the subterranean formation 170 and can be an intelligent well. In the illustrated embodiment, the well system 100 includes surface equipment 110, the completion system 150 and an insert string 120, e.g. a production string or production tubing, that communicatively connects the surface equipment 110 with the completion system 150.

In the illustrated embodiment, the completion system 150 is implemented as a lower completion that provides power and information to downhole components. The completion system 150, however, is not be limited to a lower completion as it can be implemented in any well completion where there is production tubing running proximate to another tubing string. The production tubing can be, for example, a string to the surface or a liner.

The surface equipment 110 is located at a surface 130 and configured to handle the downhole data and remotely operate inflow control valves located downhole. In the illustrated embodiment, the surface equipment 110 includes a rig 112, a well head 114, a production line 116 and a control/power supply unit 118. The surface equipment 110 may be conventional surface equipment and include other conventional components that are not illustrated in FIG. 1.

The completion system 150 is fully installed within a wellbore 140 of the well system 100. The completion system 150 is communicatively connected to the surface equipment 110, especially to the control/power supply unit 118, using a communication line 160. The communication line 160 may include multiple communication or injection lines, e.g. sand face monitoring and control lines.

Figure 2:
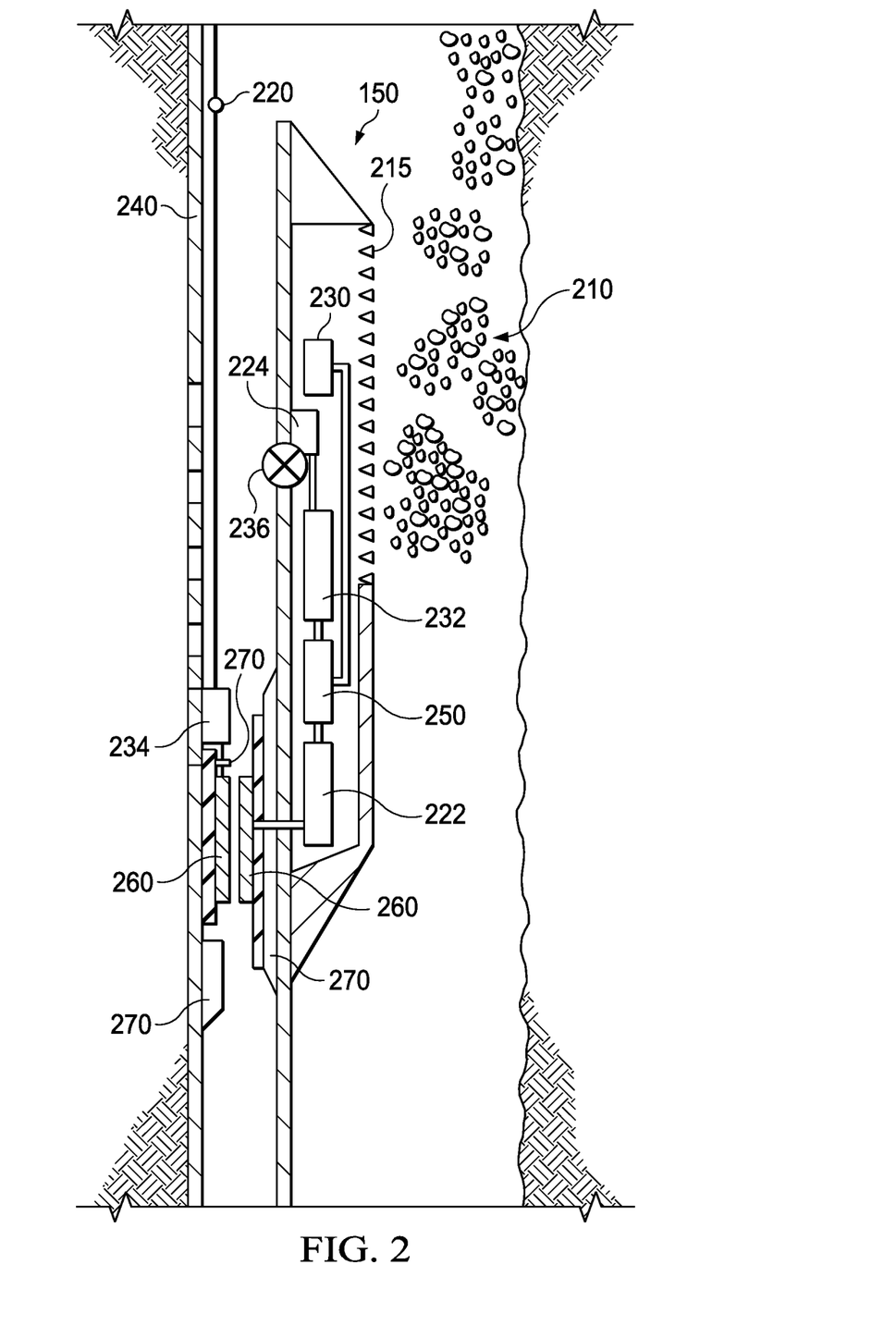
FIG. 2 is a system diagram of the permanent well completion system of FIG. 1.

FIG. 2 illustrates a system diagram of an embodiment of a portion of the completion system 150 that is communicatively coupled with the control/power supply unit 118 using the communication line 160. In the illustrated embodiment, the completion system 150 includes a gravel/frac pack 210 having a sand filter 215, power distribution electronics 250, and power sources of multiple types including an umbilical 220, e.g. a fiber optic cable or a tubing encased conductor (TEC), a battery 222, and a flow harvester 224, e.g. a turbine. The completion system 150 further includes a production tubing 240 and various downhole components such as a sensor 230, an actuator 232, a telemetry unit 234 and an inflow control valve 236, e.g. an adjustable or non-adjustable inflow control value. As mentioned above, the completion system 150 is implemented as a lower completion. Although not explicitly illustrated in FIG. 2, the completion system 150 may include other parts and components of a conventional lower completion.

The gravel pack 210 may be a conventional gravel pack that is used to prevent production of formation sand. The sand filter 215 is placed in the wellbore 140 and the surrounding annulus and designed to prevent the passage of formation sand and can include a sand screen, mesh, slotted liner, or other sand control devices.

The power distribution electronics or circuits (hereinafter "PDE") 250 is configured to receive power from various types of power sources such as the turbine 224, the battery 222 and the umbilical 220, and distribute the power to various downhole components of the completion system 150, such as the sensor 230, the actuator 232, and the telemetry unit 234.

The umbilical 220, e.g. a TEC or a fiber optics cable, represents a remotely-generated or surface-generated power source type. The remotely-generated power source may be generated other location that is remote from downhole. As such, the umbilical 220 receives power and information from the surface 130 via the communication line 160. In the illustrated embodiment, the umbilical 220 provides electrical coupling between the completion system 150 and the power supply 118. The coupling allows for power to be transferred between the insert string 120 and the completion system 150. The coupling can also allow for the communication of information between the surface and the completion system 150. As such, the power and information sent down to the umbilical 220 from the surface 130 can be transferred to one side of a wet connect 260, which is mounted on the insert string 120. The other side of the wet connect 260 is mounted on the completion system 150. In a multilateral application, the wet connect 260 may be provided at a multilateral junction for a power coupling between a main bore and a lateral. Swell rubbers 270 are placed around the wet connect 260 to prevent the electrical shorting.

Although not illustrated, the coupling between the completion system 150 and the power supply 118 may be a magnetic coupling through an inductive couple, an acoustic coupling through acoustic transducers, or a capacitive coupling, e.g. between an upper completion and a lower completion.

The battery 222 represents a downhole-stored power source type. The battery 222 can be, e.g. a primary battery, a secondary battery, or a capacitor. The primary or secondary battery may have an alkali metal, e.g. lithium or sodium, as a component in its electrode or electrolyte. The capacitor may be a supercapacitor that has in excess of 1 mF of capacitance.

The flow harvester 224 converts some of the flow energy of the well system 100 into electrical energy. As such, the flow harvester 224 represents a downhole-generated power source type. The flow harvester 224 uses a pressure drop and flow rate to create mechanical motion that is converted into electrical energy. The flow harvester 224 may be a turbine that rotates blades to generate electrical energy. The flow harvester 224 may also be vibration based power generator that vibrates a beam coupled to piezoelectric transducer, magnetostrictive transducer, or a voice coil. The voltage output from the flow harvester 224 is generally an AC signal. The flow harvester 224 may be connected to the inflow control valve 236 in either a fluid series configuration or a fluid parallel configuration.

The sensor 230, the actuator 232, the telemetry unit 234 and the inflow valve 236 are configured to operate using power distributed by the PDE 250. The sensor 230 may measure various aspects of the formation 170 such as temperature and pressure, aspects about the fluid such as flow rate, fluid composition, and particle concentration, and aspects about the installation such as system health and completion installation. The actuator 232 may shift the valve 236, open sleeves and activate other downhole components. The telemetry unit 234 may send and receive information with the surface via the umbilical 220 or wirelessly through tubing, fluid or formation. The telemetry unit 234 may be coupled to the umbilical 220 via the production tubing 240.

In the illustrated embodiment, by being able to switch between different types of power sources, the completion system 150 can sustain the failure of one or more power sources and save rig time of a well that would have been lost by the power source failure. As such, it may be especially advantageous to use the completion system 150 in a deepwater operation where the rig time is prohibitively expensive. For example, the completion system 150 may be used in an Enhanced Single-Trip Multizone (ESTMZ™) styled operation, which uses a cased hole single-trip sand control completion system, to significantly reduce the downtime caused by the failure of one or more power sources.

Figure 3:
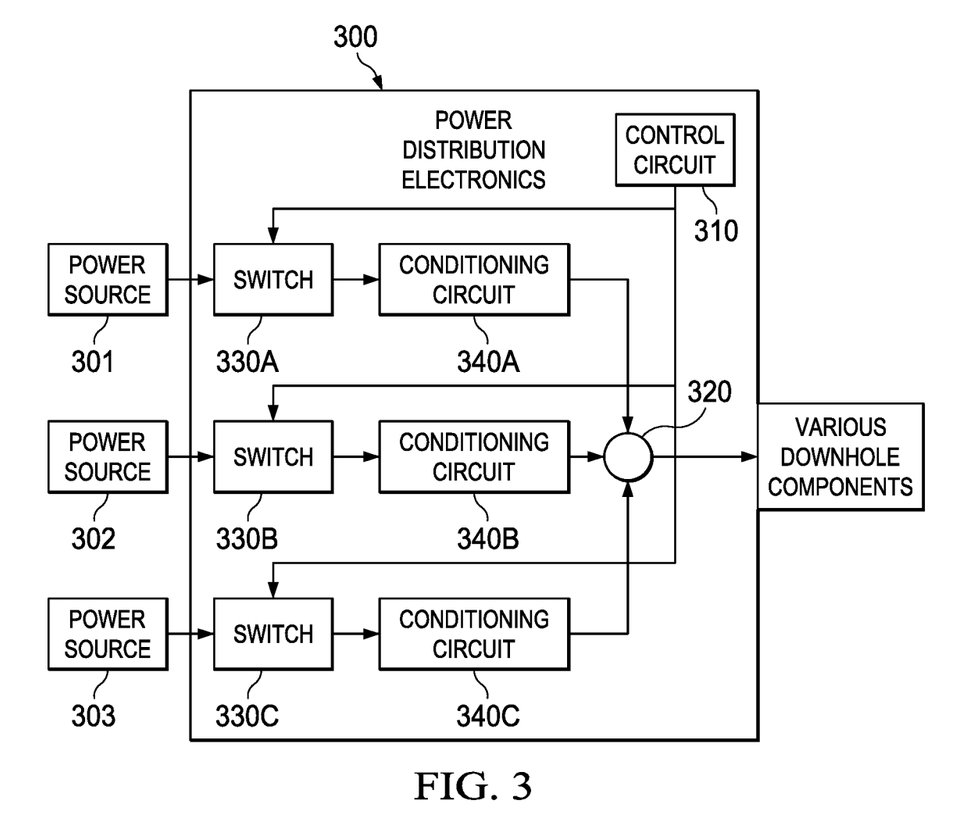
FIG. 3 is a block diagram of an example power distribution electronics.

FIG. 3 illustrates a block diagram of a power distribution circuit/electronics 300, such as the PDE 250 of FIG. 2. In the illustrated embodiment, the power distribution electronics (PDE) 300 is switchably connected to three power sources, power sources 301, 302 and 303. The three power sources 301-303 may correspond to three different types of power sources, such as a remotely-generated power source, a downhole-stored power source, and a downhole-generated power source. The PDE 300 is configured to distribute power from at least one of these three power sources to various downhole components/electronics, such as a sensor, an actuator, and a telemetry unit, of a permanent well completion system. The term "switchably" means that the connection is not permanent and can be disconnected at any time based on a control signal, e.g. a control signal from the PDE.

In the illustrated embodiment, the PDE 300 includes a control circuit 310, a power distribution node 320, switches 330A, 330B, and 330C and conditioning circuits 340A, 340B, and 340C. The control circuit 310 is configured to select at least one power source from the three power sources based on a selection priority of the power sources. The priority may be pre-determined based on an operation mode the well completion system is in. Once at least one power source has been selected, the control circuit 310 can connect the selected source to the power distribution node 320 using the switches 330. Although not illustrated, the PDE 300 may include a processor and a memory.

The power distribution node 320 is switchably connected to each of the three power sources via respective switches 330 and conditioning circuits 340. The power distribution node 320 is configured to receive power from the connected power sources and distribute the received power to the various downhole components/electronics. The power distribution node 320 may be a power bus. Although the power distribution node 320 is illustrated as a part of the PDE 300 in FIG. 3, the power distribution node 320 may be implemented outside of the PDE 300 as a separate unit.

The switches 330 may be a conventional relay or a unipolar transistor such as a field-effect transistor (FET) that is operable based on the control signals generated by the control circuit 310. The conditioning circuits 340 may be various electrical devices for conditioning, e.g., regulating, converting, and filtering power/information from each power source to an appropriate form. For example, the conditioning circuits 340 may be an AC/DC converter, a buck-boost converter, a transformer, and even a filter (for filtering signal from the surface generated power source). The conditioning circuits 340 may also include a power diode to limit the back driving of the different power sources. If one power source, e.g. an umbilical, produces a higher voltage than the other power source, e.g. a turbine, then the PDE 300 may have the option of switching the turbine to open circuit or using the power diode to prevent the power in the umbilical from running through the turbine.

Figure 4A:
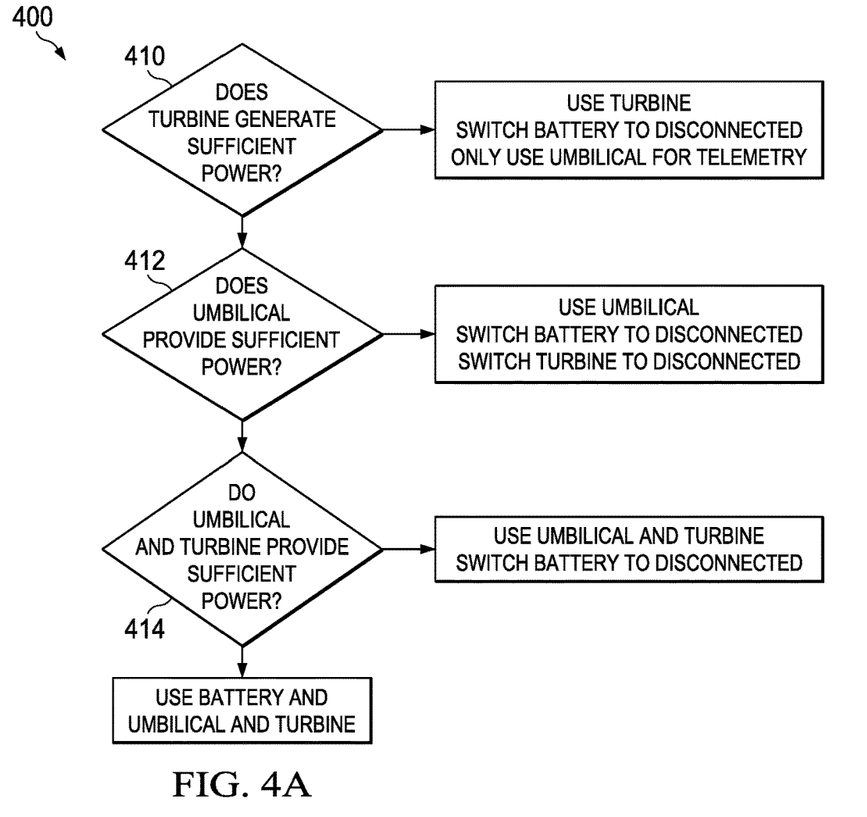
FIGS. 4A-C are flow diagrams of example power source selection processes.
Figure 4B:
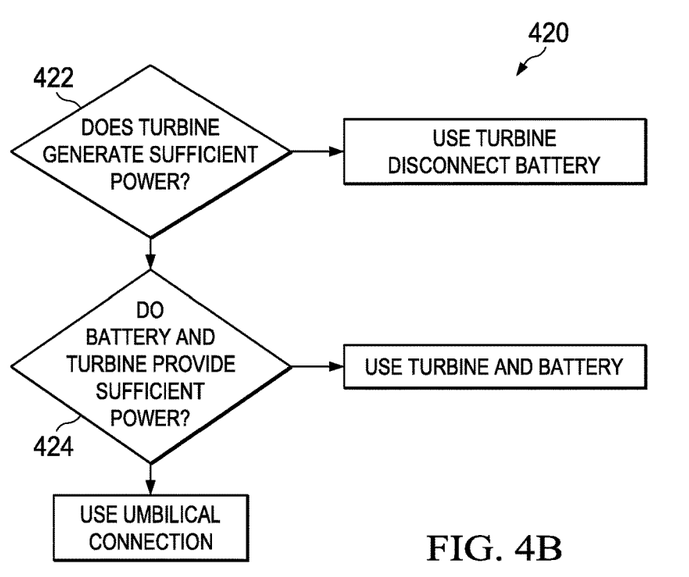
Figure 4C:
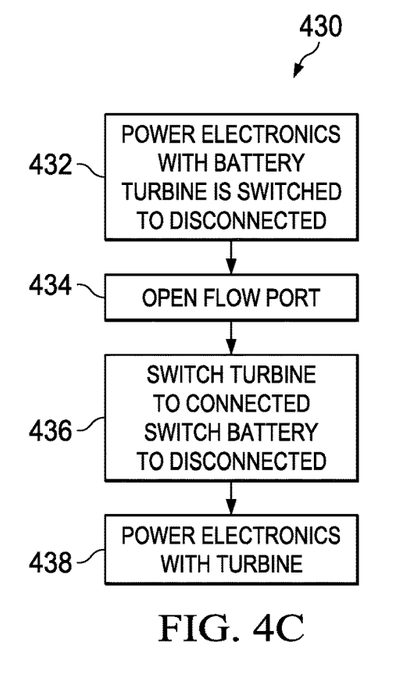

FIGS. 4A-4C illustrate flow diagrams of exemplary power source selection processes. As mentioned above, the power sources are selected in order of a selection priority. The priority may be based on a mode the PDE is operating under, e.g. a test mode, a sleep mode, a sensor mode, a telemetry mode or an actuation mode. For example, for the actuation mode, a battery may have higher priority than an umbilical and a flow harvester/turbine to provide a power boost during the actuation, e.g. shifting of a valve or a sleeve, and for the telemetry mode where an umbilical is used to transfer data, a turbine or a battery may have the highest priority to reduce the stress applied to the umbilical. In a sleep mode where power consumption is low, the highest priority may be given to the umbilical which allows more of the downhole components to be placed into a power-saving sleep state. The priorities may be pre-programmed, e.g. before the installation of completions, and re-programmed after the installation by a command sent from the surface. The priorities may programmable to change based on the performance or the operational health of each power sources.

In FIG. 4A, an exemplary selection process 400 for a sensor mode is illustrated. For the process 400, a turbine has the highest priority, followed by an umbilical and then by a battery. This priority allows the PDE to save the battery until all other power sources fails or do not provide sufficient power. The PDE first asks at step 410 whether the turbine generate sufficient power for the sensor mode, e.g. sufficient power for operating a sensor and a telemetry unit. If the turbine does, the PDE uses the turbine while disconnecting the battery. The umbilical is only used for the telemetry unit. If the turbine does not provide sufficient power, the PDE asks whether the umbilical provides sufficient power at step 412. If the umbilical does, the PDE uses the umbilical and disconnect both the battery and the turbine. If the umbilical does not provide sufficient power, the PDE then finally asks whether a combination of the umbilical and the turbine provides sufficient power at step 414. If so, the PDE uses the umbilical and the turbine and disconnects the battery. But if the combination does not provide sufficient power, the PDE use all three power sources. It is understood that instead of using all three power sources, the PDE may only use the battery if it can provide sufficient power.

In FIG. 4B, an exemplary selection process 420 for a test mode is illustrated. This mode allows the PDE to test the reliability and longevity of a turbine and a battery while saving an umbilical as a backup source. The turbine has the highest priority, followed by the battery and then by the umbilical. The PDE first asks at step 422 whether the turbine generates sufficient power. If the turbine does, the PDE uses the turbine while disconnecting the battery. If the turbine does not generate sufficient power, the PDE determines whether a combination of the battery and the turbine provides sufficient power at step 424. If the combination does, the PDE uses the combination. But if the combination does not provide sufficient power, the PDE uses the umbilical.

In FIG. 4C, an exemplary selection process 430 for an actuation mode is illustrated. This mode may represent an early stage of a completion installation where an umbilical is not yet available or a rare situation where the umbilical has failed. In this configuration, the PDE uses a battery to power a downhole component/electronics, e.g. a wireless system for power and information transfer from a proximate tubing, until a flow port is opened. As such, in step 432, the turbine is disconnected. In a step 434, the flow port is opened. The flow port may be opened by battery powered electronics, by a shifted sleeve, or by a plug dissolving. In a step 436, the PDE connects the turbine and disconnects the battery. In a step 438, the electronics are powered by the turbine.

It is understood that the processes shown in FIGS. 4A-C are examples and are not limiting. It is also understood that when a power source is determined to generate/provide insufficient power, that power source is disconnected from the PDE, e.g. a distribution node of the PDE, just in case that the power source may have developed a short that can drain the power from the rest of the system.

Figure 5:
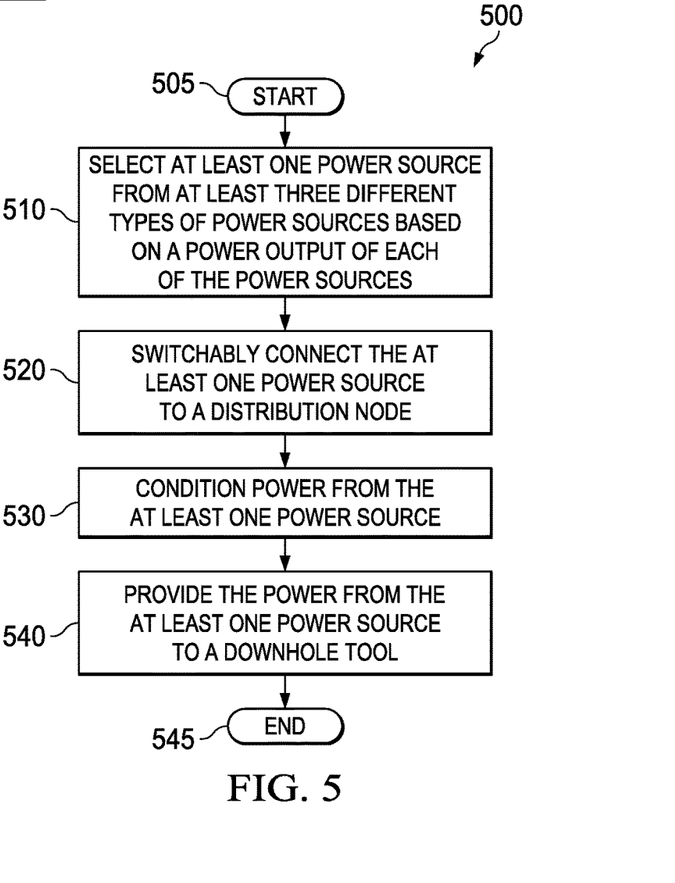
FIG. 5 is a flow diagram of an example method for powering downhole components.

FIG. 5 illustrates a flow diagram of an example of a method 500 for powering downhole components, such as a sensor, an actuator and a telemetry unit of a permanent well completion system. The method may be performed by a power distribution electronics (PDE), such as the PDEs 250 and 300 of FIGS. 2 and 3. The method begins at step 505.

In a step 510, at least one power source is selected from at least three different types of power sources based on a selection priority of the power sources. As discussed above, at least three types of power sources may include a remotely or surface generated power source such as an umbilical, a TEC or a fiber optical cable, a downhole or locally stored power source such as a primary/secondary battery or a capacitor, and a downhole or locally generated power source such as a flow harvester or a turbine. The selection priority may be determined based on a mode the PDE is operating under. In addition to the priority, the power source may be selected based on a power output of each power source. The step 510 may be carried out by a control circuit of the PDE, such as the control circuit 310 of FIG. 3.

In a step 520, the selected at least one power source is switchably connected to a distribution node of the PDE such as the power distribution node 320 of FIG. 3. This connection allows the distribution node to receive power from the connected power source. The distribution may be implemented as a power bus.

In a step 530, the power from the connected power sources are conditioned. This step may be performed by conditioning circuits of the PDE such as the conditioning circuits 340 of FIG. 3. For example, power from a flow harvester, which is AC signal, may be converted into DC signal employing an AC/DC converter, and power, e.g. voltage, from an umbilical or a battery may be modified using a buck-boost converter. For information received from a remotely or surface generated power source, a filter may be employed as a conditioning circuit to filter out unwanted noise or signal.

In a step 540, the power from the connected power source is provided to the appropriate component(s) of the permanent well completion system. The power is provided by the distribution node of the PDE. For a surface generated power source, information from the surface may also be provided to the appropriate downhole component. The method 500 ends in a step 545.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, or any type of computing or electronic device.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g. magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Embodiments disclosed herein include:

A. A completion system of a wellbore, comprising at least three different types of power sources for powering a downhole component in a wellbore and a power distribution circuit including a power distribution node and a control circuit, wherein the control circuit is configured to select at least one power source of the at least three different types of power sources to connect to the power distribution node based on a selection priority of the power sources, and the power distribution node is configured to provide power from the at least one power source to the downhole component.

B. A method for powering a downhole component of a wellbore, employing a completion system, the method comprising selecting at least one power source from at least three different types of power sources of the completion system based on a selection priority of the at least three different types of power sources, switchably connecting the at least one power source to the downhole component, and providing power from the at least one power source to the downhole component.

C. A power distribution device for powering a downhole component of a completion system, comprising a power distribution node, and a control circuit; wherein the control circuit is configured to select at least one power source from at least three different types of power sources of the completion system to connect to the distribution node based on a selection priority of the at least three different types of power sources, and the power distribution node is configured to provide power from the at least one power source to the downhole component.

Each of embodiments A, B, and C may have one or more of the following additional elements in combination:
Element 1: wherein the power distribution circuit further includes at least one switch that is configured to switchably connect the distribution node to the at least one power source. Element 2: wherein the at least one of the power sources is selected based further on a power output of each of the at least three different types of power sources. Element 3: the priority is based on an operating mode of the power distribution circuit. Element 4: a gravel pack configured to prevent a production of formation sand. Element 5: wherein the downhole component is selected from the group consisting of a sensor, an actuator, and a telemetry unit. Element 6: wherein the at least three different types of power sources include a surface-generated power source, a downhole-generated power source, and a downhole-stored power source. Element 7: a production tubing coupled between the surface-generated power source and the downhole equipment. Element 8: conditioning power from the at least one power source. Element 9: receiving information at the downhole component from a surface of the wellbore using the surface generated power source. Element 10: wherein the completion system includes a production tubing that runs proximate another tubing string. Element 11: at least one conditioning circuit that is configured to condition power from the at least one power source. Element 12: at least one switch that is configured to switchably connect the distribution node to the at least one power source.

What is claimed is:

1. A completion system, comprising:
a downhole component;
at least three different types of power sources that power the downhole component of the completion system in a wellbore, wherein the at least three different types of power sources include a surface-generated power source, a downhole-generated power source, and a downhole-stored power source; and
a power distribution circuit including:
a power distribution node; and
a control circuit that determines a selection priority of the at least three different types of power sources based on one of operation modes, under which the power distribution circuit is currently operating, and selects at least one power source of the at least three different types of power sources to connect to the power distribution node based on the determined selection priority and power outputs of the at least three different types of power sources, wherein each of the operation modes has a different selection priority, and the power distribution node provides power from the at least one power source to the downhole component.

2. The completion system of claim 1, wherein the power distribution circuit further includes at least one switch that switchably connects the power distribution node to the at least one power source.

3. The completion system of claim 1, wherein the selection priority is defined for each mode before an installation of the completion system.

4. The completion system of claim 3, wherein the selection priority is changed based on an operational health of each of the at least three different types of power sources.

5. The completion system of claim 1, further comprising a gravel pack that prevents a production of formation sand.

6. The completion system of claim 1, wherein the downhole component is selected from the group comprising an inflow control valve, a sensor, an actuator, and a telemetry unit.

7. The completion system of claim 1, further comprising a production tubing coupled between the surface-generated power source and the downhole component.

8. A method for powering a downhole component of a completion system in a wellbore, the method comprising:
  determining a selection priority of at least three different types of power sources based on one of operation modes, under which a power distribution circuit of the completion system is operating under;
  selecting at least one power source from the at least three different types of power sources of the completion system based on the determined selection priority of the at least three different types of power sources and power outputs of the at least three different types of power sources, wherein each of the operation modes has a different selection priority, and the at least three different types of power sources include a surface-generated power source, a downhole-generated power source, and a downhole-stored power source;
  switchably connecting the at least one power source to the downhole component of the completion system in the wellbore; and
  providing power from the at least one power source to the downhole component.

9. The method of claim 8, further comprising conditioning power from the at least one power source.

10. The method of claim 8, wherein the selection priority is defined for the mode before an installation of the completion system.

11. The method of claim 8, wherein the downhole component is selected from the group comprising a sensor, an inflow control valve, an actuator, and a telemetry unit.

12. The method of claim 8, further comprising receiving information at the downhole component from a surface of the wellbore using the surface-generated power source.

13. The method of claim 8, wherein the completion system includes a production tubing that runs proximate another tubing string.

14. A power distribution device for a completion system in a wellbore that includes a downhole component and at least three different types of power sources, the power distribution device comprising:
  a power distribution node; and
  a control circuit determines a selection priority of the at least three different types of power sources based on one of operation modes that the power distribution device is operating under, and selects at least one power source from the at least three different types of power sources of the completion system to connect to the power distribution node based on the determined selection priority of the at least three different types of power sources and power outputs of the at least three different types of power sources;
  wherein each of the operation modes has a different selection priority, and the at least three different types of power sources of the completion system include a surface-generated power source, a downhole-generated power source, and a downhole-stored power source, and the power distribution node provides power from the at least one power source to the downhole component of the completion system in the wellbore.

15. The power distribution device of claim 14, further comprising at least one conditioning circuit that to conditions power from the at least one power source.

16. The power distribution device of claim 14, further comprising at least one switch that switchably connects the power distribution node to the at least one power source.

17. The power distribution device of claim 14, wherein the selection priority is defined for the mode before an installation of the completion system.

18. The power distribution device of claim 14, wherein the downhole component is selected from the group comprising an inflow control value, a sensor, an actuator, and a telemetry unit.

19. The power distribution device of claim 14, wherein the completion system includes a production tubing that runs proximate another tubing string.

* * * * *

UNITED STATES PATENT AND TRADEMARK OFFICE
CERTIFICATE OF CORRECTION

PATENT NO. : 11,313,206 B2
APPLICATION NO. : 15/778072
DATED : April 26, 2022
INVENTOR(S) : Michael Linley Fripp et al.

It is certified that error appears in the above-identified patent and that said Letters Patent is hereby corrected as shown below:

On the Title Page

Item (57) Line 2 of abstract, after --In one example,-- delete "in"

In the Claims

Claim 15, Column 10, Line 28, after --conditioning circuit that-- delete "to"

Signed and Sealed this
Fifth Day of July, 2022

Katherine Kelly Vidal
*Director of the United States Patent and Trademark Office*